United States Patent
Tsunekawa et al.

(10) Patent No.: US 11,492,837 B2
(45) Date of Patent: Nov. 8, 2022

(54) VEHICLE DOOR OPENING/CLOSING DEVICE

(71) Applicant: TOYODA GOSEI CO., LTD., Kiyosu (JP)

(72) Inventors: Yuichi Tsunekawa, Kiyosu (JP); Hitoshi Horibe, Kiyosu (JP)

(73) Assignee: TOYODA GOSEI CO., LTD., Kiyosu (JP)

( * ) Notice: Subject to any disclaimer, the term of this patent is extended or adjusted under 35 U.S.C. 154(b) by 356 days.

(21) Appl. No.: 16/769,970

(22) PCT Filed: Jan. 11, 2019

(86) PCT No.: PCT/JP2019/000663
§ 371 (c)(1),
(2) Date: Jun. 4, 2020

(87) PCT Pub. No.: WO2019/187496
PCT Pub. Date: Oct. 3, 2019

(65) Prior Publication Data
US 2020/0386031 A1 Dec. 10, 2020

(30) Foreign Application Priority Data
Mar. 29, 2018 (JP) .............. JP2018-065 812

(51) Int. Cl.
E05F 15/73 (2015.01)
G06T 7/70 (2017.01)
(Continued)

(52) U.S. Cl.
CPC .............. E05F 15/73 (2015.01); G06T 7/60 (2013.01); G06T 7/70 (2017.01); G06V 20/56 (2022.01);
(Continued)

(58) Field of Classification Search
CPC .............. E05F 15/73; E05F 2015/763; E05F 2015/765; E05F 2015/767; E05F 15/611;
(Continued)

(56) References Cited

U.S. PATENT DOCUMENTS 6,542,071 B1 4/2003 Ohtsubo et al.
11,098,520 B2 * 8/2021 Tamura .................. E05F 15/73
(Continued)

FOREIGN PATENT DOCUMENTS

JP 2001-234653 A 8/2001
JP 2009-137434 A 6/2009
(Continued)

OTHER PUBLICATIONS

International Search Report (ISR) (PCT Form PCT/ISA/210), in PCT/JP2019/000663, dated Mar. 5, 2019.

Primary Examiner — Paulos M Natnael
(74) Attorney, Agent, or Firm — McGinn IP Law Group, PLLC

(57) ABSTRACT

In order to notify a user of a vehicle of a sensor position in an easily understandable manner to easily open and close a vehicle door by an operation performed by the user of the vehicle, a vehicle door opening/closing device includes: a road surface projection unit configured to project a display representing a position at which shape identification is performed, on a road surface around a vehicle; a shape identification unit configured to perform identification of a shape of an object in a predetermined road surface range including the display projected by the road surface projection unit; and a control unit configured to drive opening or closing of a vehicle door when the shape that is identified by the shape identification unit for the object in the predetermined road surface range represents a shape of a foot portion of a person.

6 Claims, 4 Drawing Sheets

(51) Int. Cl.
*G06T 7/60* (2017.01)
*B60R 25/25* (2013.01)
*B60R 25/31* (2013.01)
*H04N 9/31* (2006.01)
*G06V 20/56* (2022.01)
*B60J 5/10* (2006.01)

(52) U.S. Cl.
CPC .......... *H04N 9/31* (2013.01); *B60J 5/10* (2013.01); *B60R 25/25* (2013.01); *B60R 25/31* (2013.01); *E05Y 2400/44* (2013.01); *E05Y 2400/45* (2013.01); *E05Y 2400/858* (2013.01); *E05Y 2600/46* (2013.01); *E05Y 2900/546* (2013.01); *G06T 2207/30252* (2013.01)

(58) Field of Classification Search
CPC ... G06T 7/60; G06T 7/70; G06T 2207/30252; G06V 20/56; G06V 10/255; G06V 40/10; H04N 9/31; H04N 9/3194; H04N 9/3182; B60J 5/10; B60R 25/25; B60R 25/31; B60R 25/2054; E05Y 2400/44; E05Y 2400/45; E05Y 2400/858; E05Y 2600/46; E05Y 2900/546; E05B 49/00

See application file for complete search history.

(56) References Cited

U.S. PATENT DOCUMENTS

| | | |
|---|---|---|
| 11,180,946 B2 * | 11/2021 | Tamura .................. B60R 25/24 |
| 2007/0225933 A1 * | 9/2007 | Shimomura ........... G06V 20/56 |
| | | 382/103 |
| 2019/0329782 A1 * | 10/2019 | Shalev-Shwartz ... G08G 1/0145 |
| 2020/0024886 A1 * | 1/2020 | Tamura .................. B60R 25/24 |
| 2020/0349366 A1 * | 11/2020 | Takemura ................ B60Q 9/00 |
| 2021/0164283 A1 * | 6/2021 | Tamura ...................... B60J 5/04 |

FOREIGN PATENT DOCUMENTS

| | | |
|---|---|---|
| JP | 2015-021238 A | 2/2015 |
| JP | 2016-035191 A | 3/2016 |
| JP | 2016-069903 A | 5/2016 |

* cited by examiner

VEHICLE DOOR OPENING/CLOSING DEVICE

TECHNICAL FIELD

The present invention relates to a vehicle door opening/closing device for automatically opening and closing a vehicle door.

BACKGROUND ART

To date, a vehicle door opening/closing device for driving opening or closing of a door, for example, a back door of a vehicle has been known (for example, Patent Literature 1). The vehicle door opening/closing device includes an electrostatic sensor for detecting a user who approaches the vehicle. The electrostatic sensor includes sensor electrodes, and detects change of capacitance of the sensor electrode or change of an electric field generated between the sensor electrodes. The electrostatic sensor includes a lower sensor disposed at a rear bumper or the like, and an upper sensor disposed upward of the lower sensor. The lower sensor has at least two sensor portions, and detects a foot portion of a user of the vehicle. The upper sensor detects a body of the user of the vehicle excluding the foot portion.

In the vehicle door opening/closing device described above, when a detection signal from one of the sensor portions of the lower sensor and a detection signal from the upper sensor are inputted, the vehicle door is driven to open or close. Meanwhile, when detection signals from the two sensor portions of the lower sensor are inputted, the vehicle door is not driven or is stopped. Therefore, the vehicle door is prevented from being erroneously driven to open or close based on detection of a small animal, an object, or the like.

CITATION LIST

Patent Literature

Patent Literature 1: JP2015-021238A

SUMMARY OF INVENTION

Technical Problem

However, in the vehicle door opening/closing device, a user who approaches the vehicle does not easily recognize a range of the electric field generated by the electrostatic sensor, that is, the position of the electrostatic sensor. Therefore, the user of the vehicle needs to perform a particular action such as shaking his/her foot near the rear bumper in order to open or close the vehicle door. Thus, the vehicle door is not easily opened or closed in some cases.

The present invention has been made in view of such circumstances, and an object of the present invention is to provide a vehicle door opening/closing device that notifies a user of a vehicle of a sensor position in an easily understandable manner to easily open and close a vehicle door by an operation performed by the user of the vehicle.

Solution to Problem

A vehicle door opening/closing device according to the present invention includes: a road surface projection portion configured to project a display representing a position at which shape identification is performed, on a road surface around a vehicle; a shape identification portion configured to perform identification of a shape of an object in a predetermined road surface range including the display projected by the road surface projection portion; and a door control portion configured to drive opening or closing of a vehicle door when the shape that is identified by the shape identification portion for the object in the predetermined road surface range represents a shape of a foot portion of a person.

In this configuration, the display representing a position at which the shape identification is performed is projected on a road surface around the vehicle by the road surface projection portion, and the shape identification portion performs identification of a shape of an object in the predetermined road surface range including the projected display. When the shape represents a shape of a foot portion of a person, the vehicle door is driven to open or close. That is, when the user of the vehicle visually recognizes the display that represents the position where the shape identification is performed and that is projected on the road surface around the vehicle, and puts his/her foot portion in the predetermined road surface range including the display, the vehicle door is driven to open or close. By the display projected on the road surface around the vehicle, the user of the vehicle is notified of the position at which the shape identification is performed for opening or closing the vehicle door, in an easily understandable manner. The user of the vehicle merely performs visual recognition of the display on the road surface and puts his/her foot in the predetermined road surface range including the display in order to open or close the vehicle door, thereby allowing the vehicle door opening/closing device to sufficiently perform identification of the shape of the foot portion. Thus, according to the present invention, the user of the vehicle is notified of the position at which the shape identification is performed in an easily understandable manner, thereby easily opening and closing the vehicle door by the operation performed by the user of the vehicle.

DESCRIPTION OF EMBODIMENTS

A vehicle door opening/closing device of the present invention will be described below according to specific embodiments and modifications with reference to the drawings.

Figure 1:
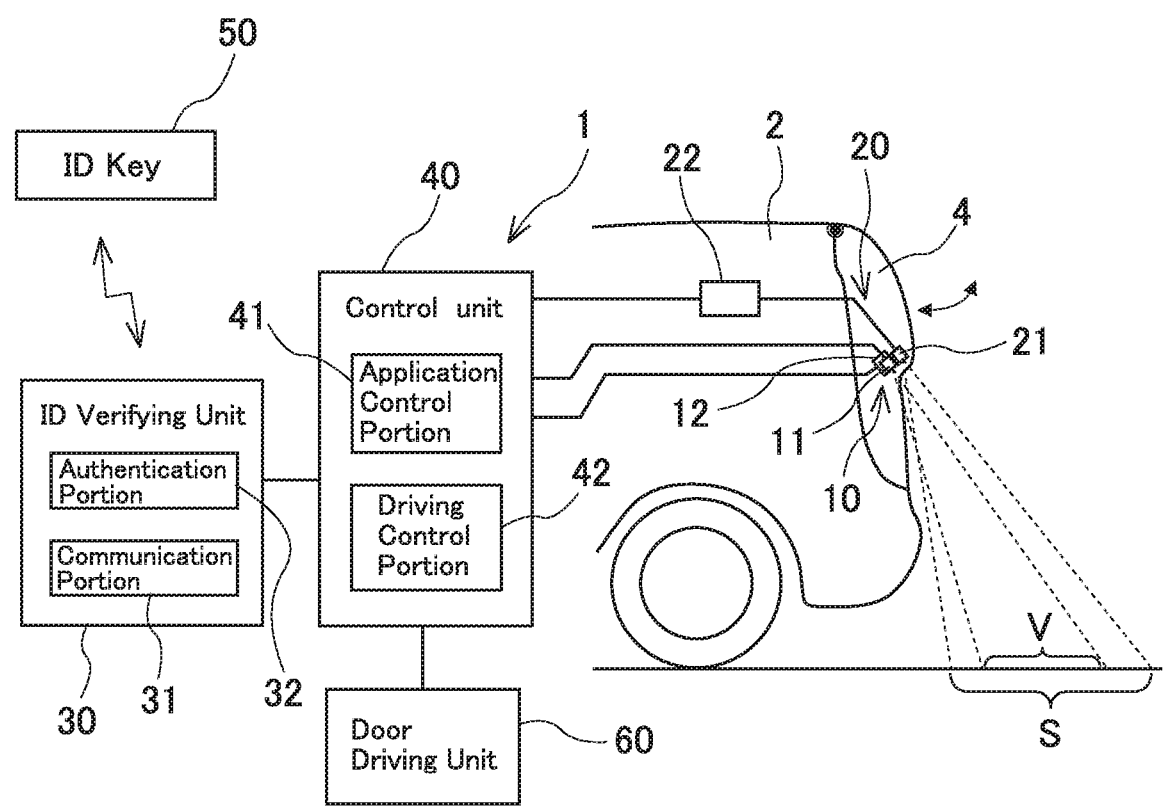
FIG. 1 illustrates a configuration of a vehicle door opening/closing device according to one embodiment of the present invention.
Figure 2:
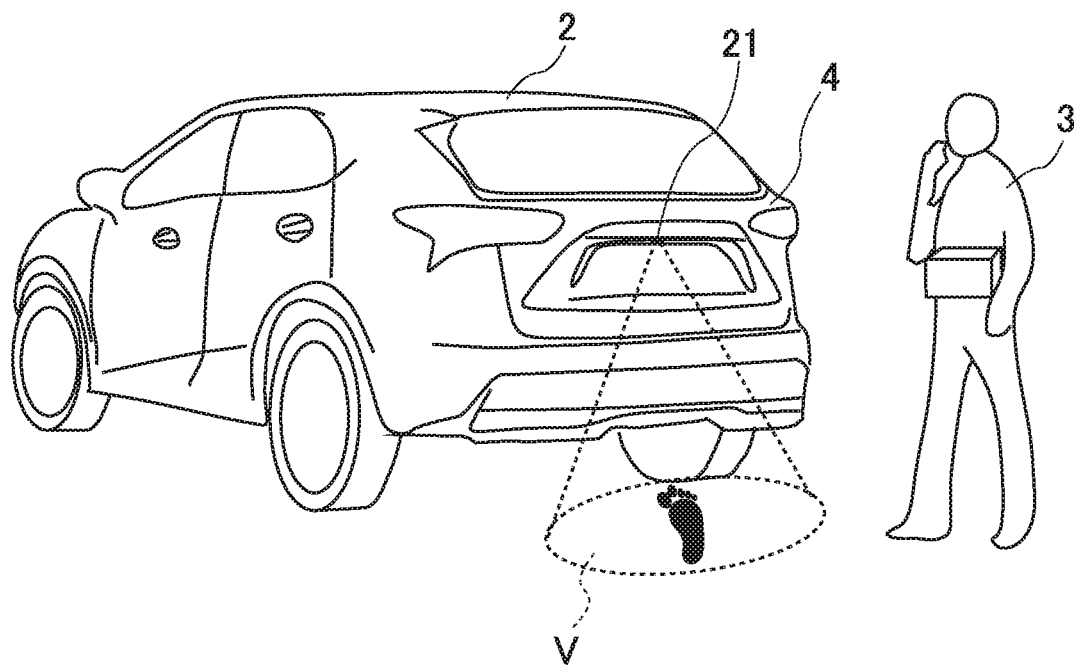
FIG. 2 is a schematic diagram illustrating an example of display projected on a road surface by a road surface projection unit of the vehicle door opening/closing device according to the embodiment.

A vehicle door opening/closing device 1 of the present embodiment is mounted to a vehicle 2 as shown in FIG. 1 and FIG. 2, and automatically opens or closes (specifically, opens) a vehicle door 4 of the vehicle 2, for example, before a user 3 of the vehicle 2 gets in the vehicle 2. The vehicle door 4 is any door of the vehicle 2. However, the vehicle door 4 is a back door in the following description. The vehicle door opening/closing device 1 includes a road surface projection unit 10, a shape identification unit 20, an ID verifying unit 30, a control unit 40, and a door driving unit 60, as shown in FIG. 1.

The road surface projection unit 10 projects a display V on a road surface around (specifically, behind) the vehicle 2. The road surface projection unit 10 is mounted, by a bracket or the like, at almost the center (for example, an upper wall of a recessed portion in which a back door handle or a number plate is stored) of the outer surface of the back door 4 of the vehicle 2. The road surface projection unit 10 is not necessarily mounted to the openable/closable back door 4 by a bracket or the like. The road surface projection unit 10 is also mountable to, for example, a rear bumper fixed to the body of the vehicle 2. The road surface projection unit 10 has a projection portion 11 and a mechanism portion 12.

The projection portion 11 applies light such as laser or collected LED light that is visible to a person. The projection portion 11 applies the light to a road surface that is distant from the rear end of the vehicle 2 in the backward direction over a predetermined distance (for example, 50 cm to 3 m). The projection portion 11 projects the display V having a predetermined planar shape by light applied to the road surface. The display V projected by the projection portion 11 has such a high illuminance as to allow the display to be visible during the daytime. A part or the entirety of the display has a hue (for example, green) that has high visibility during the daytime. Furthermore, the hue preferably represents a color that contrasts with the color of the road surface. The display V projected by the projection portion 11 has such a proper illuminance as to allow the display to be visible without glare at night. The projection portion 11 is allowed to change the illuminance and the hue for the display as described above according to change of brightness in the surroundings due to time, climate, illumination, or the like. Furthermore, the display V projected on the road surface is allowed to blink in order to improve, for example, visibility or noticeability.

The display V having a predetermined planar shape indicates a position (hereinafter, referred to as sensor position) at which the shape identification described below is executed. For example, the display V includes a shape similar to the shape of a foot sole of a person as shown in FIG. 1, or a shape similar to the outer appearance of the vehicle 2. In this case, for example, the display V includes a round shape or an ellipsoidal shape that surrounds the peripheral portion of the shape similar to the shape of the foot sole, as well as the shape similar to the shape of a foot sole of a person or the outer appearance of the vehicle 2, in order to distinguish a region representing the sensor position from other regions. The display V is, for example, represented by contrast between light and shadow by using a silhouette or the like.

The mechanism portion 12 changes the orientation of the optical axis of light applied by the projection portion 11. The mechanism portion 12 is disposed adjacent to the projection portion 11 described above. The mechanism portion 12 optionally moves the projection portion 11 by using an actuator such as a motor in the left, right, upper, and lower directions, so that a position (that is, projection position) on a road surface on which the display V is projected by light being applied by the projection portion 11 is changeable.

The shape identification unit 20 performs identification of a shape of an object in a predetermined road surface range S including the display V projected on the road surface by the road surface projection unit 10. The shape identification unit 20 has a camera 21 and an identification portion 22. The camera 21 is mounted, by a bracket or the like, at almost the center (for example, a recessed portion for a back door handle or a number plate) of the outer surface of the back door 4 of the vehicle 2, and disposed adjacent to the projection portion 11 described above. The camera 21 takes an image of the display V on the road surface by light applied by the projection portion 11.

The imaging region of the camera 21 is identical to the predetermined road surface range S in which a shape is to be identified or is wider than the predetermined road surface range S. When the imaging region of the camera 21 is wider than the predetermined road surface range S in which a shape is to be identified, video image information for the shape identification is limited to a part of the entire video image information of the video image taken by the camera 21. The predetermined road surface range S in which a shape is to be identified includes the entirety of the display V, and is also allowed to include a region other than the display V. The camera 21 is, for example, a ToF (=Time-of-Flight) camera.

Figure 3:
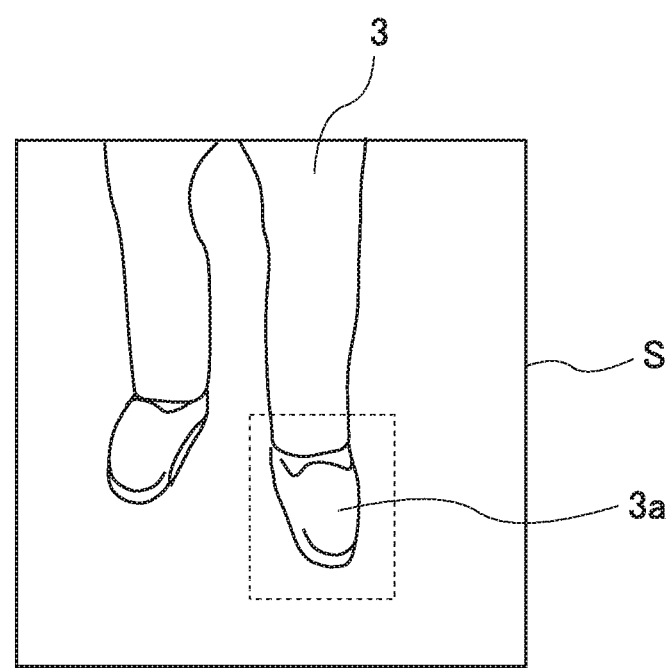
FIG. 3 is a schematic diagram illustrating an example of information of a video image taken by a camera of a shape identification unit of the vehicle door opening/closing device according to the embodiment.

The identification portion 22 performs identification of a shape of an object in the predetermined road surface range S based on the video image information of the video image taken by the camera 21, as shown in FIG. 3. The identification portion 22 previously stores shape information of a person's foot portion of which the shape is to be identified. The foot portion of which the shape information is stored particularly includes the end of the foot portion of a person, and the foot portion is, for example, a shoe of the person. The shape of the foot portion to be stored is preferably the shape of the end of a foot portion 3a specific to the user 3, and, further, preferably includes the shape of the end of a shoe that is unlikely to be hidden by clothes of a person. The shape of the foot portion to be stored includes, for example, the orientation relative to the vehicle 2, and the shape is, for example, a shape of a toe of a person who opposes the back door 4 of the vehicle 2, that is, who faces toward the front side of the vehicle 2.

The identification portion 22 determines whether or not the shape of an object in the predetermined road surface range S represents a shape of the foot portion 3a of a person, by performing, for example, template matching for video image information from the camera 21. The shape determination performed by the identification portion 22 indicates an affirmative result when the shape of the foot portion 3a of the person continues to be fixedly identified for a predetermined time (for example, 1 second or 2 seconds).

The ID verifying unit 30 performs ID authentication for the user 3 of the vehicle 2. The ID authentication is performed for automatically opening the back door 4 before the user 3 gets in the vehicle 2 or loads baggage into luggage compartment. More specifically, the ID authentication is performed for projecting the display on a road surface by the road surface projection unit 10 described above. The ID verifying unit 30 is an on-vehicle device mounted to the vehicle 2. The ID verifying unit 30 includes a communication portion 31 and an authentication portion 32.

The communication portion 31 communicates with an ID key 50 held by the user 3 who is away from the back door 4 in a predetermined distance range (for example, 1 m to 3 m). The communication portion 31 transmits a request signal for requesting a response from the ID key 50, at predetermined time intervals. The ID key 50 includes a communication portion and a control portion. The communication portion of the ID key 50 is allowed to communicate with the communication portion 31 of the ID verifying unit 30. The communication portion of the ID key 50 receives a request signal transmitted by the communication portion 31. When the communication portion has received the request signal from the ID verifying unit 30, the control portion of the ID key 50 causes the communication portion to transmit a response signal in response to the request signal. The communication portion 31 receives the response signal from the ID key 50 after the request signal has been transmitted.

The communication portion 31 is connected to the authentication portion 32. The communication result at the communication portion 31 is supplied to the authentication portion 32. The authentication portion 32 performs the ID authentication of the ID key 50 based on the communication result at the communication portion 31. The ID verifying unit 30 is connected to the control unit 40. When the ID has been authenticated as OK in the ID authentication of the ID key 50, the authentication portion 32 notifies the control unit 40 that the ID has been authenticated as OK in the ID authentication.

The control unit 40 performs various controls for driving opening and closing of the back door 4. The control unit 40 is implemented by a microcomputer having a calculation portion, a memory, and the like. The control unit 40 is installed on, for example, the floor of the vehicle 2. The control unit 40 includes an application control portion 41 and a driving control portion 42.

The application control portion 41 controls projection of the display on a road surface by the road surface projection unit 10. The control unit 40 is connected to the road surface projection unit 10. When the ID verifying unit 30 has made notification that the ID has been authenticated as OK in the ID authentication, the application control portion 41 instructs the road surface projection unit 10 to project the display on the road surface. The road surface projection unit 10 projects the display on the road surface according to the instruction from the application control portion 41.

The control unit 40 is connected to the shape identification unit 20. When the identification portion 22 determines that the shape of an object in the predetermined road surface range S represents the shape of a foot portion of a person, the shape identification unit 20 supplies the shape identification information to the control unit 40. The driving control portion 42 drives opening and closing of the back door 4. The driving of opening and closing of the back door 4 includes opening and closing of the back door 4 around a rotary shaft disposed in the vehicle body, and also includes locking and unlocking of the back door 4. The control unit 40 is connected to the door driving unit 60. When the shape identification unit 20 provides the shape identification information indicating that the shape of the object in the predetermined road surface range S represents the shape of a foot portion of a person, the driving control portion 42 instructs the door driving unit 60 to open or close the back door 4.

The door driving unit 60 drives opening and closing of the back door 4. The door driving unit 60 has an actuator such as a motor for driving opening and closing of the back door 4. The door driving unit 60 operates the actuator according to the instruction from the driving control portion 42, to drive opening and closing of the back door 4.

Figure 4:
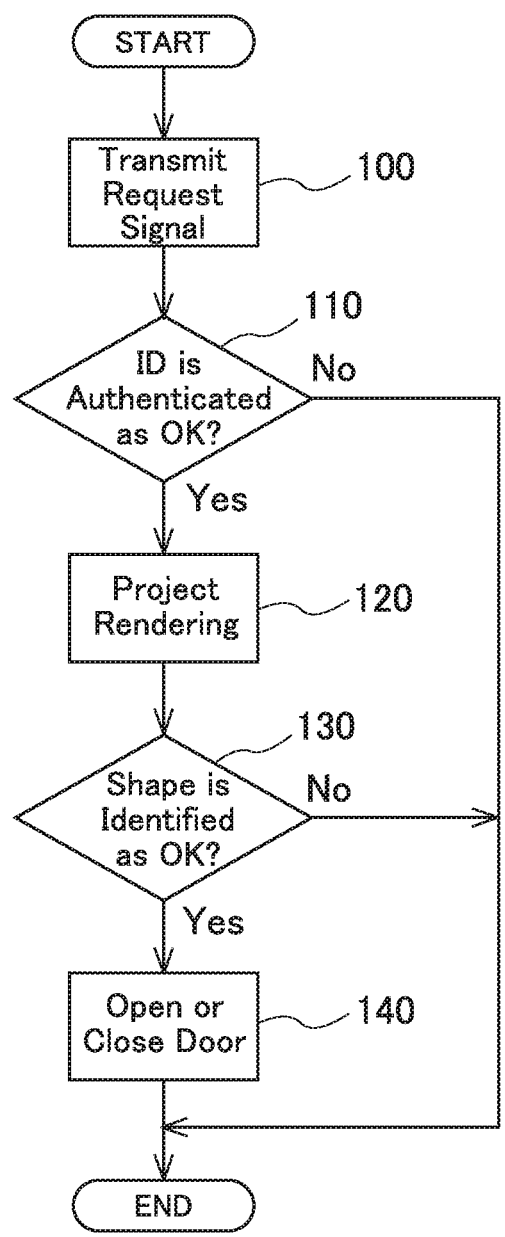
FIG. 4 is a flow chart showing an example of a control routine executed by the vehicle door opening/closing device according to the embodiment.
Figure 5:
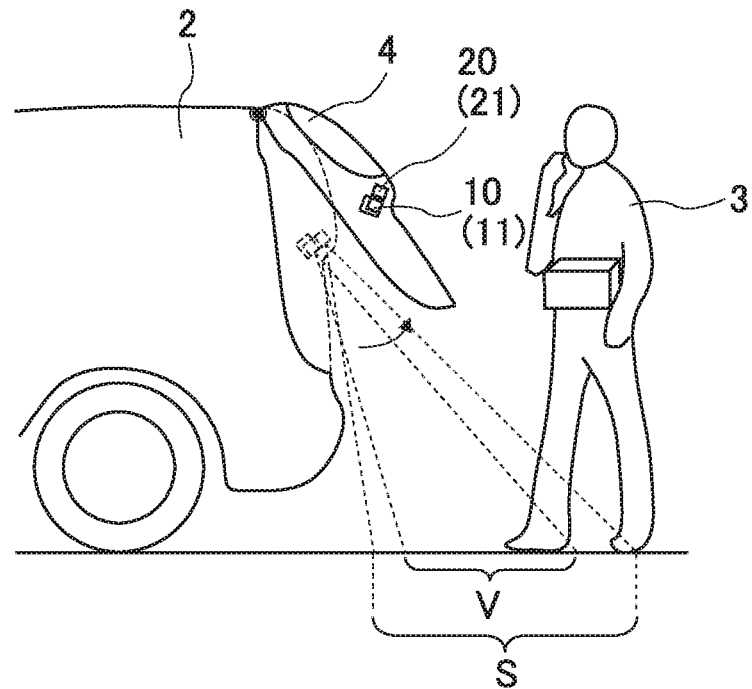
FIG. 5 is a schematic diagram illustrating a state where a door is opened by the vehicle door opening/closing device according to the embodiment.

Next, an operation of the vehicle door opening/closing device 1 will be described with reference to FIG. 4 and FIG. 5.

In the vehicle door opening/closing device 1, when the back door 4 is closed, the communication portion 31 of the ID verifying unit 30 transmits a request signal in a predetermined distance range located rearward of the back door 4 (step S100). Each time the request signal is transmitted, the response signal is received from the ID key 50, and the authentication portion 32 determines whether or not the ID is authenticated as OK in the ID authentication of the ID key 50 based on the response signal (step S110 shown in FIG. 4).

Before the user 3 of the vehicle 2 gets into the vehicle 2 or loads baggage into the luggage compartment, the user 3 with the ID key 50 approaches the back door 4. When the ID key 50 of the user 3 is not in a request signal transmission range (that is, in the predetermined distance range), no response signal is supplied from the ID key 50 to the vehicle door opening/closing device 1. Therefore, after that, the vehicle door opening/closing device 1 does not perform any control process.

Meanwhile, when the ID key 50 of the user 3 is in the request signal transmission range, the ID key 50 transmits, to the vehicle door opening/closing device 1, a response signal in response to the request signal. When the communication portion 31 receives the response signal from the ID key 50 after the request signal has been transmitted, the authentication portion 32 performs the ID authentication of the ID key 50 based on the response signal. When the ID is authenticated as OK in the ID authentication, the control unit 40 receives the notification that the ID has been authenticated as OK.

When the ID verifying unit 30 makes notification that the ID has been authenticated as OK in the ID authentication, the application control portion 41 of the control unit 40 instructs the road surface projection unit 10 to project the display on the road surface. When the projection portion 11 of the road surface projection unit 10 is instructed, by the application control portion 41, to project the display, the projection portion 11 applies light onto the road surface that is distant from the rear end of the vehicle 2 in the backward direction over a predetermined distance, to project the display V having the predetermined planar shape on the road surface (step S120). The projection portion 11 is allowed to continue to project the display V as long as the ID is authenticated as OK in the ID authentication by the ID verifying unit 30, or until a certain time elapses after the start of the projection. The projection is stopped, for example, when the ID is not authenticated in the ID authentication by the ID verifying unit 30, when the certain time has elapsed after the start of the projection, or when the back door 4 is opened.

The user 3 of the vehicle 2 approaches the vehicle 2 and visually recognizes the display V projected on the road surface by the road surface projection unit 10 as described above. At this time, when the user 3 would like to open the back door 4, the user 3 puts his/her foot on the road surface on which the display V is projected. In a state where the display V is projected on the road surface by the road surface projection unit 10, the shape identification unit 20 uses the camera 21 to perform identification of the shape of the object in the predetermined road surface range S including the display V and determines whether or not the shape represents the shape of the end of the foot portion 3a of the person (step S130).

When the identification portion 22 of the shape identification unit 20 determines that the shape of the object in the predetermined road surface range S represents the shape of the end of the foot portion 3a of the person, the shape identification information is supplied to the driving control portion 42 of the control unit 40. When the information from the shape identification unit 20 represents the shape of the end of the foot portion 3a of the person, the driving control portion 42 instructs the door driving unit 60 to open the back door 4. When receiving the instruction for opening the door, from the driving control portion 42, the door driving unit 60 operates the actuator to drive opening of the back door 4 (step S140).

Thus, in the vehicle door opening/closing device 1, at a time when the user 3 of the vehicle 2 approaches the back door 4 of the vehicle 2, the road surface projection unit 10 projects the display V having a predetermined planar shape on the road surface behind the vehicle 2. When the user 3 puts his/her foot on the road surface on which the display V is projected, and the shape identification unit 20 identifies the shape of the foot portion 3a of the user 3, the back door 4 is driven to open. That is, the user 3 of the vehicle 2 visually recognizes the display V projected on the road surface around the vehicle 2, and puts his/her foot in the predetermined road surface range S including the display V, thereby driving opening of the back door 4. The display V projected on the road surface represents a sensor position for driving opening of the back door 4, that is, a position at which the shape identification is performed.

Therefore, in the vehicle door opening/closing device 1, the road surface projection unit 10 is used to notify the user 3 of the sensor position for driving opening of the back door 4 through visual recognition. The user 3 merely performs visual recognition of the display V on the road surface and puts his/her foot in the predetermined road surface range S including the display V in order to drive opening of the back door 4, thereby allowing the vehicle door opening/closing device 1 to sufficiently identify the foot portion 3a.

Accordingly, in the vehicle door opening/closing device 1, the user 3 of the vehicle 2 is notified of the sensor position in an easily understandable manner. The user 3 need not be accustomed to operation for opening the back door 4, and usability for the user 3 to open the back door 4 is improved, thereby easily opening the back door 4. Furthermore, the user 3 merely puts his/her foot in the predetermined road surface range S including the display V in order to open the back door 4. Therefore, for example, one of the feet need not be moved close to a vehicle body in which an electrostatic sensor is disposed, unlike in the structure using, for example, an electrostatic sensor for opening the back door 4, so that the back door 4 is smartly opened with an action which maintains stable posture.

In order to open the back door 4, the shape identification unit 20 needs to identify the shape of the end of the foot portion 3a of a person in the predetermined road surface range S behind the vehicle body. That is, when, for example, a foot of a person is not in the predetermined road surface range S while a stationary or an adjacent object other than a person, a puddle, or the like is in the predetermined road surface range S, the back door 4 is not opened. Therefore, the back door 4 is prevented from being erroneously opened due to a stationary or an adjacent object other than a person.

The display V which is projected by the projection portion 11 of the road surface projection unit 10 for notifying the user 3 of the vehicle 2 of the sensor position has high illuminance and a hue that has high visibility during the daytime. Therefore, also in the daytime, the user 3 is allowed to visually recognize, with ease, the display V by the projection portion 11. Furthermore, the display V projected by the projection portion 11 has such a proper illuminance as to allow display to be visible without glare at night. Therefore, the user 3 is allowed to visually recognize, with ease, the display V by the projection portion 11 even at night. Accordingly, usability for the user 3 to open the back door 4 is prevented from degrading.

In the above-described embodiment, the road surface projection unit 10 corresponds to "road surface projection portion" in CLAIMS, the shape identification unit 20 corresponds to "shape identification portion" in CLAIMS, and the driving control portion 42 of the control unit 40 corresponds to "door control portion" in CLAIMS.

In the above-described embodiment, the camera 21 is used to identify the shape of an object in the predetermined road surface range S. The camera 21 doubles as a back camera for displaying a video image on an on-vehicle monitor when the vehicle 2 moves backward. In the structure according to the modification, a camera dedicated to identify the shape of an object in the predetermined road surface range S need not be disposed. Thus, an operation of driving opening of the back door 4 based on the shape identification is achieved with a simple configuration at low cost.

Figure 6:
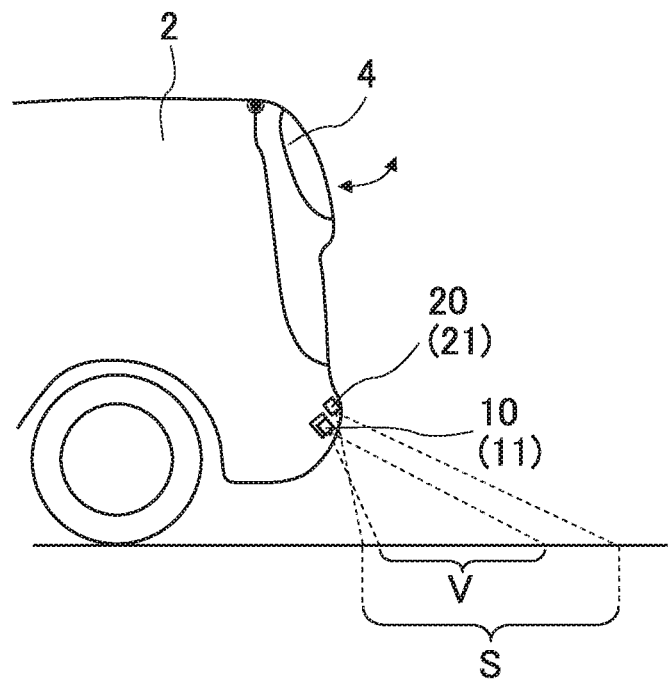
FIG. 6 illustrates a structure of a main portion of a vehicle door opening/closing device according to a modification of the present invention.

In the above-described embodiment, the projection portion 11 of the road surface projection unit 10 and the camera 21 of the shape identification unit 20 are attached to the openable/closable back door 4, and the vehicle door opening/closing device 1 automatically opens the back door 4. However, the present invention is not limited thereto. The present invention is also applicable to a device in which the projection portion 11 and the camera 21 are fixed to the vehicle body (for example, bumper) of the vehicle 2 as shown in FIG. 6, and the back door 4 is automatically opened by the vehicle door opening/closing device 1, and, further, the back door 4 is automatically closed when, for example, the user 3 gets off the vehicle 2 or unloads baggage from the luggage compartment.

In the above-described embodiment, the projection portion 11 projects the display V having a predetermined planar shape on a road surface that is distant from the rear end of the vehicle 2 in the backward direction over a predetermined distance. If the display is projected on a road surface which is fixedly determined relative to the rear end of the vehicle 2 and which is positioned rearward of the rear end of the vehicle 2, when a stationary object or an adjacent object is at a position on the road surface, identification of the shape of the foot portion of the user 3 is likely to become difficult. Therefore, after the ID is authenticated as OK in the ID authentication by the ID verifying unit 30, the projection position on the road surface on which the display V having the predetermined planar shape is projected by the projection portion 11 of the road surface projection unit 10 is allowed to be changed according to the position of the user 3 relative to the vehicle 2.

For example, after the ID is authenticated as OK in the ID authentication by the ID verifying unit 30, the orientation of the optical axis of the camera 21 is changed or a zoom magnification is shifted to a wide-angle side to widen the imaging region, and the position of the user 3 behind the vehicle 2 is detected based on the shape identification result from the video image information. When the position of the user 3 is detected, the optical axis and the zoom magnification of the camera 21 are fixed such that the position is included in the predetermined road surface range S, and the projection position on the road surface on which the display V having the predetermined planar shape is projected by the projection portion 11 is then changed according to the position of the user 3. When the projection position is changed, the orientation of the optical axis of the projection portion 11 is changed by using the mechanism portion 12 such that the display V is projected on the road surface between the vehicle 2 and the user 3 (specifically, immediately before the user 3).

According to the modification, the position of the display V projected by the projection portion 11 is changed according to the position of the user 3. Therefore, even if a stationary or an adjacent object, a puddle, or the like is at a road surface, the shape of the foot portion 3a of the user 3 is easily identified, and usability for the user 3 to open the back door 4 is improved. In the modification, detection of the position of the user 3 behind the vehicle 2 based on the shape identification result from video image information of the camera 21 by the shape identification unit 20 corresponds to "position detection portion" in CLAIMS, and change of orientation of the optical axis of the projection portion 11 by the application control portion 41 with the use of the mechanism portion 12 of the road surface projection unit 10 corresponds to "projection position changing portion" in CLAIMS.

Furthermore, in the above-described embodiment, the door that is opened and closed in the vehicle 2 by the vehicle door opening/closing device 1 is the back door 4. However, the present invention is not limited thereto. The door that is opened and closed in the vehicle 2 by the vehicle door opening/closing device 1 is, for example, a sliding door for a rear seat or a front door.

The present invention is not limited to the above-described embodiment and modification, and various changes are made without departing from the gist of the present invention.

This application claims priority from Japanese Patent Application No. 2018-065812 filed in Japan on Mar. 29, 2018, the entire contents of which are incorporated herein by reference.

DESCRIPTION OF REFERENCE CHARACTERS

1: vehicle door opening/closing device
2: vehicle
3: user
4: vehicle door (back door)
10: road surface projection unit
11: projection portion
12: mechanism portion
20: shape identification unit
21: camera
22: identification portion
30: ID verifying unit
40: control unit
41: application control portion
42: driving control portion
50: ID key
60: door driving unit

The invention claimed is:

1. A vehicle door opening/closing device comprising:
a road surface projection portion configured to project a display representing a position at which shape identification is performed, on a road surface around a vehicle;
a shape identification portion configured to perform identification of a shape of an object in a predetermined road surface range including the display projected by the road surface projection portion; and
a door control portion configured to drive opening or closing of a vehicle door when the shape that is identified by the shape identification portion for the object in the predetermined road surface range represents a shape of a foot portion of a person, wherein
the shape identification portion performs identification of a shape of an object in the predetermined road surface range by using a camera attached to the vehicle door.

2. The vehicle door opening/closing device according to claim 1, wherein the road surface projection portion projects the display on the road surface at a time when a user of the vehicle approaches the vehicle.

3. The vehicle door opening/closing device according to claim 2, further comprising:
a position detection portion configured to detect a position of the user relative to the vehicle; and
a projection position changing portion configured to change a projection position on the road surface on which the display is projected by the road surface projection portion, according to the position detected for the user by the position detection portion.

4. The vehicle door opening/closing device according to claim 3, wherein the projection position changing portion sets the projection position on the road surface between the vehicle and the user whose position is detected by the position detection portion.

5. The vehicle door opening/closing device according to claim 1, wherein the road surface projection portion projects the display on the road surface by light having a hue that has a high visibility during daytime.

6. The vehicle door opening/closing device according to claim 1, wherein the door control portion drives opening or closing of the vehicle door when the shape that is identified by the shape identification portion for an object in the predetermined road surface range represents a shape of a shoe worn by a predetermined person.

* * * * *